Feb. 3, 1970     H. F. FOULKE ET AL     3,493,905
HYSTERESIS DAMPER
Filed Dec. 30, 1965
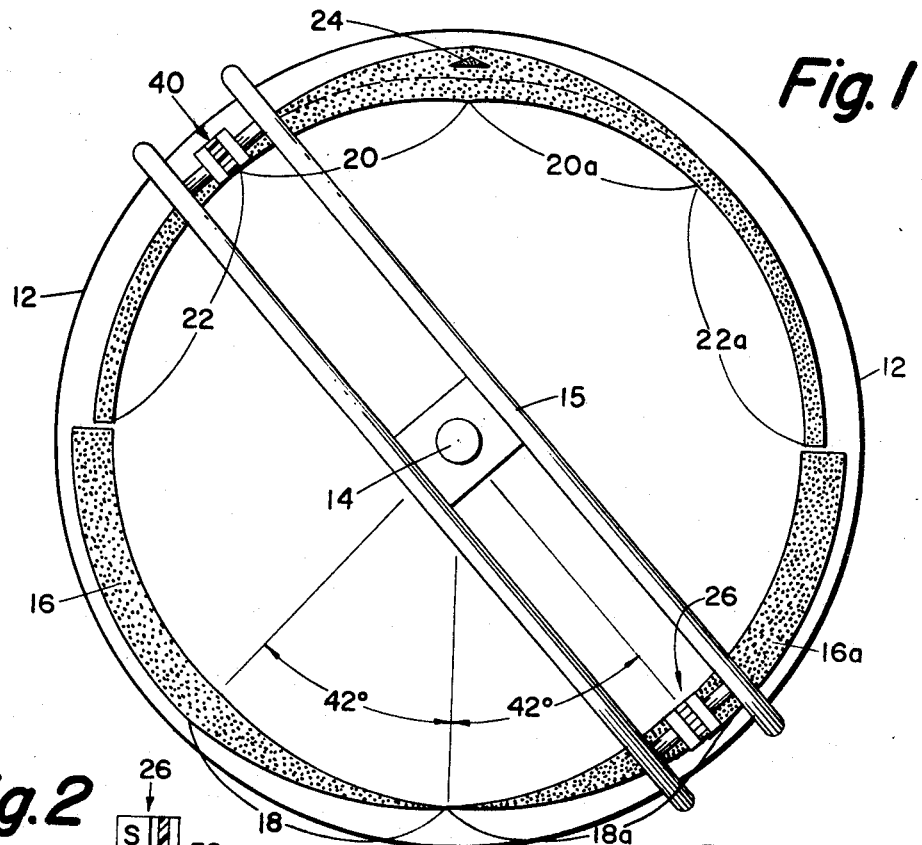
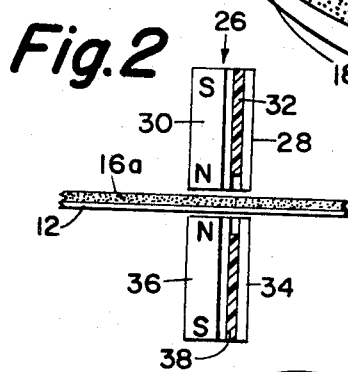
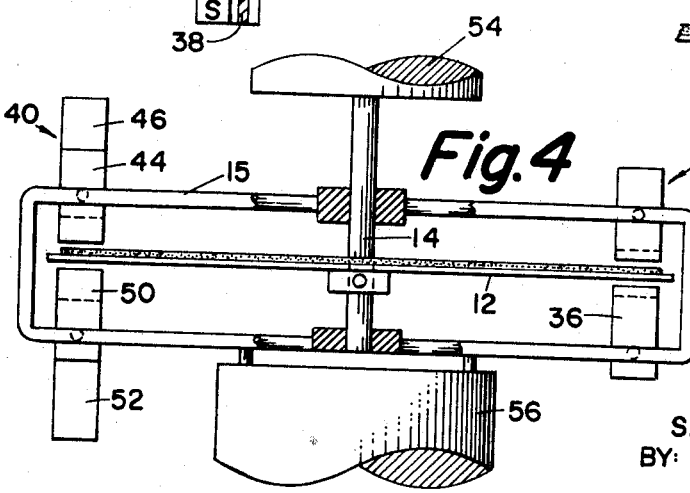
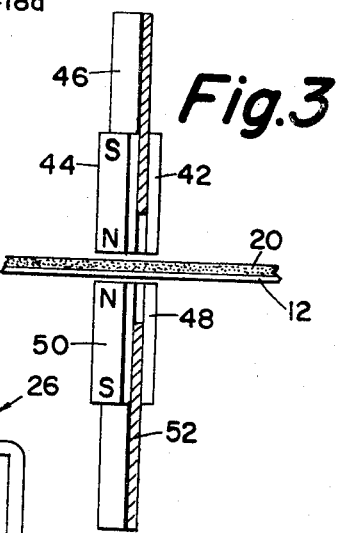
INVENTORS
HOWARD F. FOULKE
AARON I. KAIT
SANFORD M. WEINBERGER
BY: *Henry W. Kaufmann*
AGENT

United States Patent Office 3,493,905
Patented Feb. 3, 1970

3,493,905
HYSTERESIS DAMPER
Howard F. Foulke, Dresher, Aaron I. Kait, Philadelphia, and Sanford M. Weinberger, Wynnewood, Pa., assignors to General Electric Company, a corporation of New York
Filed Dec. 30, 1965, Ser. No. 517,664
Int. Cl. H01f 7/08; G01r 1/14
U.S. Cl. 335—225                                          7 Claims This invention pertains to devices for damping mechanical oscillations.

Many mechanical devices comprise two portions one of which can move with respect to the other, and having some means for applying restoring forces to tend to bring the two portions into a particular neutral relation to one another after they have been displaced from such relation. Since all mechanical systems have mass, there are present the elements of an oscillatory system. To damp out oscillations between the two portions of such a system, it is conventional to provide some energy dissipating means coupled to the two portions. Perhaps the simplest such device is one producing drag or opposing force (or torque) approximately proportional to velocity, such as an eddy-current damper or its equivalent viscous fluid damper. These have the advantage that their effect decreases as the amplitude of oscillations (and consequently the velocity) decreases and thus the system may move to the neutral point without being stopped by the damping means before reaching it. However, velocity-proportional damping has the disadvantage that, because its effect decreases with decreasing amplitude of oscillations, it tends to allow small-amplitude oscillations to continue for a very long time. Fixed-force (or torque) damping which is negligibly a function of velocity is obtainable by such crude means as a brake shoe held at constant force against a brake drum, or by such comparatively sophisticated means as a centrally symmetrical piece of ferro-magnetic material of high hysteresis loss rotating in a fixed magnetic field. Fixed-force (or torque) damping has the advantage that it dissipates the same energy per unit displacement (e.g. foot or radian) of oscillation regardless of the velocity. It has, however, the unfortunate characteristic that, since it always opposes movement of the system, it ultimately opposses movement of the system to its true neutral position. If the torque tending to restore the two system portions to their neutral position is proportional to the displacement of the portions from that neutral position, constant force or torque damping will produce a so-called "dead band" of system positions on either side of the true neutral position, the bounds of this dead band being the displacements at which e.g. the restoring torque is equal in magnitude to the damping torque. Another way of describing the action of constant-force or constant-torque damping is that the two parts whose relative motion is to be damped are "locked up" by a force or torque which prevents their relative motion until an applied force or torque greater than the constant damping force or torque causes them to "break" loose and move relatively to one another. Alternatively, two such parts originally oscillating relatively to one another may, at a certain lower limit of stored energy, "lock up" and oscillate together.

It is evident that it would be desirable to provide a damping device which would, for displacements from the neutral position, provide a constant force or torque, but would decrease this to substantially zero in the immediate vicinity of the neutral position. This we have done by rigidly connecting magnetic materials of different hysteresis characteristics and exposing them to a fixed magnetic field. Generally speaking, in the rotary embodiment the material of high hysteresis loss is employed to provide a damping torque; but it tends to produce also unstabilizing torques tending to drive the system away from its neutral position—a defect obviously extremely objectionable, which we overcome by using low-hysteresis material to provide stabilizing torques opposing the unstabilizing torques.

Thus, the general object we achieve is to provide a damping device having superior energy dissipating properties which are not disproportionately decreased by decrease in velocity, and yet do not oppose the return of the damped system to its neutral position. Various other beneficial objects will flow from this in various applications: economy, simplicity, reliability, effectiveness, as well as semantic permutations of virtues which will be clear to those skilled in the art.

For the better explanation and understanding of our invention, we have provided figures of drawing, in which FIG. 1 represents in plan a rotary embodiment of our invention in which the magnetic materials employed are distributed on a disk, FIG. 2 represents an elevation of the magnetic structure employed to provide magnetizing field to the high-hysteresis damping material, FIG. 3 represents an elevation of the magnetic structure employed to provide magnetizing field to the low-hysteresis stabilizing material, FIG. 4 represents an elevation of the device represented in FIG. 1, connected to parts whose relative motion is to be damped.

Referring to FIG. 1, there is represented a base disk 12, which is required only to be of non-magnetic material of suitable rigidity, and in an actual embodiment was of aluminum alloy, six inches in diameter and may be of any thickness compatible with adequate rigidity, e.g. 0.030 inch. Disk 12 is mounted on a shaft 14, which is supported by a combined bearing-bracket 15.

The high-hysteresis material required to provide damping is represented by the regions marked 16, 16a, 18, and 18a which are actually connected regions of the same material. In the particular embodiment here represented as preferred, the high-hysteresis material was a concentration of approximately 2 percent, by volume, of magnetite, alias magnetic oxide of iron, dispersed in a plastic resin matrix 0.080 inch thick. Magnetite is a material commonly used in tapes for magnetic recording, in which high coercive force is desirable; it also has high hysteresis. The regions 16 and 16a are sectors of an annulus, having inner radii 2.593 inches and outer radii 2.906 inches; the regions 18 and 18a abut, respectively, 16 and 16a, and decrease linearly over 42 degrees of arc from the width of sector 16 to zero. A magnet assembly 20 is represented in plan, but detailed description of it will be deferred to discussion of FIG. 2.

The low-hysteresis material required to provide stabilizing torque is represented by regions marked 20 and 20a, and 22 and 22a. In the embodiment here represented the low-hysteresis material is a five percent concentration, by volume, of carbonyl iron in a plastic resin matrix 0.051 inch thick. Regions 20 and 20a each subtend 42 degrees of arc, and may be regarded as composed of an annular part which is simply a continuation of the annulus of 22 or 22a (respectively) plus a part which decreases linearly from the junction of 20 and 20a to the point where region 20 abuts 22 and 20a abuts 22a. Regions 22 and 22a are annular sectors having inner radii of 2.593 inches and outer radii of 2.75 inches. Regions 20 and 20a increase linearly in width as a function of angle from 0.156 inch at their respective junctions with regions 22 and 22a to a maximum width of 0.469 inch at the junction of region 20 with 20a. Regions 20 and 20a each subtend 42 degrees of arc; and the junction of regions 20 and 20a is diametrically opposite the junction of regions 18 and 18a. It should be noted that the inner and outer boundaries of regions 20 and 20a have continuously changing radii, so that neither the inner nor the outer boundaries are arcs of circles. Since the outer radius of region 22 and of region 22a is 2.75 inches, and the inner radius of each is 2.593 inches, the mean radius of regions 22 and 22a is 2.672 inches. This is also the mean radius of regions 20 and 20a, the increase in width of these regions over the width of regions 22 and 22a being equally distributed on either side of the mean radius 2.672 inches. It was found desirable to provide a small amount of additional low-hysteresis magnetic material in the vicinity of the junction of regions 20 and 20a. This is provided by the superposition of 20 and 20a of a plastic matrix 24 containing 20 percent of carbonyl iron. This matrix is 0.030 inch thick, and shaped like an isosceles triangle having a base of 0.25 inch and an altitude of 0.028 inch. It is located, as FIG. 1 indicates, with its altitude aligned with the radius defining the junction of regions 20 and 20a.

To provide magnetizing field to the high-hysteresis magnetite there is provided a magnet assembly 26, supported generally by protrusions from bearing-bracket 15 and represented in detail in FIG. 2. The operative elements of this magnet assembly are aluminum-nickel-cobalt bar magnets 28 and 30, separated by a non-magnetic spacer 32, and similar bar magnets 34 and 36, separated by a non-magnetic spacer 38. These bar magnets 28, 30, 34 and 36 are 0.90 inch long, 0.313 inch wide, and 0.10 inch thick. Separators 32 and 38 are 0.062 inch thick, and are conveniently made of plastic. The south pole of magnet 28 and the north pole of magnet 30 are at the ends closer to the disk 12, so that the combination of magnets 28 and 30 is similar to a long, narrow horseshoe magnet, except for the fact that there is a gap between the upper ends of magnets 28 and 30. Similarly, the south pole of magnet 34 and the north pole of magnet 36 are at the ends close to disk 12, forming a combination also similar to a long, narrow horseshoe magnet but with a gap at their lower ends. It will be noted that the upper combination of magnets 28 and 30 and the lower combination of magnets 34 and 36 have their respective north poles and their respective south poles opposed to each other, so that they both tend to drive flux more or less horizontally, parallel to the surface of disk 12, through the magnetite coating. The gap between the magnet poles opposed as described is 0.198 inch. The field produced by the two combinations of magnets 28 and 30 and magnets 34 and 36 is 1100 gauss, in the vicinity of the disk.

A somewhat similar magnet assembly 40 supported by protrusions from bearing-bracket 15 is provided to furnish magnetic flux to the low-hysteresis carbonyl iron. This is represented in detail in FIG. 3, in which 42 and 44 are bar magnets like 28 but, instead of a nonmagnetic spacer, there is provided a steel spacer which is adjustable vertically. Similarly, bar magnets 48 and 50 are separated by a steel spacer 52. The south poles of magnets 42 and 48, and the north poles of magnets 44 and 50 are at the ends closer to disk 12. Upper magnets 42 and 44 resemble a long thin horseshoe magnet with the gap at their upper end closed by steel spacer 46; and lower magnets 48 and 50 resemble a long, thin horseshoe magnet with the gap at their lower ends closed by steel spacer 52. The upper combination of magnets 42 and 44 has its north and south poles arranged in opposition to the north and south poles of the lower combination of magnets 48 and 50, and thus tends to drive flux horizontally parallel to the surface of disk 12. The thickness of spacers 46 and 52 is 0.062 inch, like that of nonmagnetic spacers 32 and 38; and the gap between the magnet poles opposed as described is 0.198 inch, as in the arrangement of FIG. 2. However, the magnets 42, 44, 48 and 50 are less strongly magnetized than their counterparts 28, 30, 34, and 36; so the magnetizing field produced by the combination of magnets represented in FIG. 3 is only 750 gauss when the steel spacers 46 and 52 are completely removed. By inserting the steel spacers 46 and 52 in the positions represented, and adjusting their vertical position, it is possible to adjust the field to lower values. This adjustment is desirable to permit the adjustment of the relative values of spring-like torques produced by the action of the magnetizing fields on the high-hysteresis and the low-hysteresis materials.

FIG. 4 represents an elevation, partly sectioned, of the device represented by FIG. 1, with the addition of part 56 attached to bracket-bearing 15, and part 54 attached to shaft 14 to represent the manner of attaching the embodiment to two masses whose relative motion is to be damped.

Given the apparatus as described, in the particular orientation represented, it is evident that if the disk 12 is rotated clockwise, region 16a, of uniform width, will pass under magnet assembly 26 and simultaneously region 22, of uniform width, will pass under magnet assembly 40. Since region 16a is loaded with magnetite of high-hysteresis loss, its passage between the poles of magnet assembly 26 will be opposed by a hysteretic drag; but since (because region 16a is of uniform cross section) as much ferromagnetic material will come under the poles as leaves it, there will be no net magnetic torque tending to drive the disk 12 to any particular position. Similarly, region 22 will move under the poles of magnet assembly 40; but (because its loading is low-hysteresis carbonyl iron) it will produce only a very small hysteretic drag; and, because its cross section is uniform, it also will produce no net magnetic torque tending to drive the disk 12. Thus for rotation in the direction hypothesized, there will be damping but no torque generated by either the magnetite or the carbonyl iron loading. Similarly, if the disk 12 were rotated counterclockwise through a large angle, so far that region 16 lay under the poles of magnet assembly 26, and region 22a lay under the poles of magnet assembly 40, there would be damping but no net spring torque from either the magnetite or the carbonyl iron loading. These two conditions represent the extremes of rotation of the disk 12.

If, however, the disk 12 is rotated through a small angle, only slightly counterclockwise, region 18a will begin to move under the poles of magnet assembly 26, and region 16a will move out. Since region 18a presents a decreasing cross section of magnetite-loaded material, in addition to a hysteresis drag which will be decreasing because of the decreasing amount of magnetite presented to the localized magnetizing field of magnet assembly 26, there will be a directional torque tending to oppose the counterclockwise rotation because that rotation is reducing the net amount of ferromagnetic material under the poles of magnet assembly 26. However, the same rotation will present under the poles of magnet assembly 40 the continuously increasing cross section of region 20, whose hysteresis drag is negligible, but whose significant permeability will produce a net torque tending to assist the rotation, and opposing the torque produced by the magnetite in regions 16a and/or 18a. As the counterclockwise rotation proceeds further, region 18a will present a continuously decreasing cross section, and thus a continuously decreasing hysteresis drag, but an opposing torque, until the junction of region 18a with region 18 lies under the poles of magnet assembly 26. This is the neutral or "null" point of the damper; its preferred position. But it is evident that this point, so far as concerns the magnetite high-hysteresis material in regions 18 and 18a, would be unstable, because a slight displacement in either direction will produce magnetic torques tending to increase the displacement. Thus the high-hysteresis material alone, in the configuration shown, will produce the desired hysteretic drag characteristic increasing for displacements from the neutral point and having its maximum value for large displacements which bring region 16 or 16a under the poles of magnet assembly 26; but, alone, such a configuration has the intolerable characteristic of instability, To overcome this latter undesirable characteristic, and yet preserve the desired hysteretic drag characteristic, is the function of the regions loaded with carbonyl iron low-hysteresis high-permeability material.

Displacement of disk 12 slightly counterclockwise will, as stated, bring region 18a under the poles of magnet assembly 26; but it will also bring into the localized magnetizing field under the poles of magnet assembly 40, the region 20, with its increasing cross section of high-permeability loading. A magnetic torque tending to drag region 20 farther counterclockwise will oppose the torque caused by the decreasing cross section of region 18a. By adjusting the magnetizing field produced by magnet assembly 40, the torque produced by its interaction with the carbonyl iron loading of region 20 may be made slightly greater than the magnetic torque produced by region 18a. By having the cross section of region 20 increase continuously up to its junction with region 20a, whose cross section decreases continuously for continuing rotation in the counterclockwise direction, it is possible to make the disk tend to turn to a neutral position in which the junction of regions 20 and 20a (and matrix 24) lies under the poles of magnet assembly 40, and the junction of regions 18 and 18a lies under the poles of magnet assembly 26. Thus angular oscillations between a mass connected to shaft 14 and a mass connected to bracket-bearing 16 will be damped.

The question is logical why regions 22 and 22a are provided. As has been indicated, they contribute no torque and negligible hysteresis drag when either is under the poles of magnet assembly 40. It would appear possible to remove regions 22 and 22a, and reduce the cross section of regions 20 and 20a at each point by an amount equal to the uniform cross section of regions 22 and 22a. If this were done regions 20 and 20a would have to end in finely tapering points, which are difficult to produce without tearing or other irregularities. For the reason given, the particular embodiment represented is considered preferable.

It should be noted that it is not necessary that the net restoring or spring-type torque be linear with angular rotation. Simple tailoring of the shape of the magnetic materials used will permit e.g. an indicating instrument suspension in which the scale region of interest is much expanded, and yet the scale is continuous both above and below such region.

It is evident that it is convenient, but not necessary, to employ a disk to rotate and carry the high-hysteresis and low-hysteresis high-permeability materials between the poles of different magnet assemblies. Clearly, a simple geometrical transformation can be applied which will make the various regions linear rather than circular. Linear plastic matrices can be wrapped around a circular cylinder and magnet assemblies such as 26 and 40 can be applied at the end of such a cylinder. Similarly, damping for linear motion can be provided by applying such linear matrices to a straight strip of material which will pass between the poles of magnet assemblies. Also, it is possible to superimpose the matrices carrying the magnetite and the carbonyl iron so that a single magnet assembly can provide magnetic field for both. This has the disadvantage that it is not convenient to alter the relative magnitudes of the torques (or forces) produced by each. It is, of course, conceivable that particular applications might profit by these ordinarily non-preferred embodiments, or by some equivalents thereof.

In general terms, the functioning of the invention requires a source, such as magnet assemblies 26 and 40, of localized magnetizing field, since it is necessary that relative movement of the parts of the device present various portions of the magnetic materials to the magnetizing field. A low hysteresis material such as that embodied in regions 20, 20a, 22 and 22a must be provided which is distributed in space so that it may be moved so that different parts of it will come separately into the localized magnetizing field; and the distribution of the entire mass of such material must be such that the interaction between the field and the material will produce stabilizing torques. There must be (colloquially stated) more low hysteresis material in the middle than farther from the middle; this is best formalized by a statement that the concentration of the material is a maximum at a central point, and decreases monotonically with increasing distance from that central point, the term monotonically having its usual mathematical significance that the function so described may remain constant over a part of its range, but may never reverse the sign of its rate of change. Similarly a high hysteresis material such as that of regions 16, 16a, 18 and 18a distributed in space so that it may be moved to present different parts of it to the localized magnetizing field is required, having a minimum concentration of the material at a central point, with monotonically increasing concentrations on either side of it. Regardless of the means of mounting, the result must be such that the maximum concentration of low-hysteresis ferromagnetic material and the minimum concentration of high-hysteresis ferromagnetic material are presented simultaneously to the magnetizing field. Ordinarily it will be desired that the effect of the stabilizing forces be greater than the effect of the unstabilizing forces; but if the system to which the damper is to be connected provides some stabilizing reactions, this may not be required of the damper itself.

The following is claimed:

1. A damping device comprising:
    (I) a source of localized magnetizing field;
    (II) a carrier arranged to move with respect to the source of localized magnetizing field to bring various portions of the carrier into the localized magnetized field;
    (III) a first ferromagnetic material of low hysteresis loss fixed to and so distributed along the carrier that movement of the carrier with respect to the source of localized magnetizing field will bring various portions of the first ferromagnetic material into the localized magnetizing field, the maximum concentration of the said first material being central of the distribution thereof along the carrier and the concentration at other points of the distribution decreasing monotonically with increasing distance from the central point of the distribution.
    (IV) a second ferromagnetic material of high hysteresis loss fixed to and so distributed along the carrier that movement of the carrier with respect to the source of localized magnetizing field will bring various portions of the second ferromagnetic material into the localized magnetizing field, the minimum concentration of the said second material being central of the distribution thereof along the carrier and the concentration at other points of the distribution increasing monotonically with increasing distance from the central point of the distribution;
    (V) the distributions of the said first and the said second materials being so located on the carrier that by movement of the carrier the central points of both distributions may be brought simultaneously into the localized magnetizing field.

2. A damping device according to claim 1 in which the therein said
    (I) source of localized magnetizing field comprises at least one permanent magnet;
    (II) carrier arranged to move as a piece of nonmagnetic material having circular symmetry and arranged to rotate.

3. A damping device according to claim 2 in which the therein said
    (I) piece of nonmagnetic material having circular symmetry is a flat disk, arranged to rotate around its center.

4. A damping device according to claim 1 in which the therein said
   (I) first ferromagnetic material of low hysteresis loss fixed to the carrier is in the form of small particles incorporated in a nonmagnetic matrix.

5. A damping device according to claim 1 in which the therein said
   (I) second ferromagnetic material of high hysteresis loss fixed to the carrier is in the form of small particles incorporated in a nonmagnetic matrix.

6. A damping device comprising in combination:
   (I) a first ferromagnetic material of high hysteresis loss arranged to move in a localized magnetizing field and so shaped that a minimal amount of the first material is subjected to the localized magnetizing field when the first ferromagnetic material is in a central position with respect to the localized magnetizing field, whereby the hysteresis drag opposing motion is a minimum in such position and the magnetic forces produced by interaction between the magnetizing field and the first ferromagnetic material tend to render its said central position an unstable one;
   (II) a second ferromagnetic material of low hysteresis loss arranged to move in a localized magnetizing field and so shaped that a maximal amount of the second material is subjected to the localized magnetizing field when the second ferromagnetic material is in a central position with respect to the localized magnetizing field, whereby the magnetic forces produced by interaction between the magnetizing field and the second ferromagnetic material tend to render its central position a stable one;
   (III) the said first and said second ferromagnetic materials being connected together so that when one said material is in its said central position the other said material will be in its said central position.

7. A damping device as claimed in claim 6, characterized by the fact that the magnetic forces produced by interaction between the magnetizing field and the second ferromagnetic material are greater in effect than the magnetic forces produced by interaction between the magnetizing field and the first ferromagnetic material, whereby the device is stable in its central position.

References Cited

UNITED STATES PATENTS

| | | | |
|---|---|---|---|
| 2,722,617 | 11/1955 | Cluwen et al. | 310—103 |
| 2,940,044 | 6/1960 | Warsaw | 324—125 |

GEORGE HARRIS, Primary Examiner

U.S. Cl. X.R.

310—103; 324—125

PO-1050
(5/69)

UNITED STATES PATENT OFFICE
CERTIFICATE OF CORRECTION

Patent No. 3,493,905            Dated   February 3, 1970

Inventor(s) Howard F. Foulke, Aaron I. Kait, Sanford M. Weinberger

It is certified that error appears in the above-identified patent and that said Letters Patent are hereby corrected as shown below:

Column 6, line 34, change "magnetized" to -- magnetizing --

SIGNED AND
SEALED
JUN 23 1970

(SEAL)
Attest:

Edward M. Fletcher, Jr.
Attesting Officer

WILLIAM E. SCHUYLER, JR.
Commissioner of Patents